March 22, 1927.

BEST AVAILABLE COPY

W. H. PRIESS 1,621,901

ELECTRICAL APPARATUS

Original Filed Dec. 5, 1921   3 Sheets-Sheet 2

INVENTOR
William H. Priess
BY
ATTORNEY

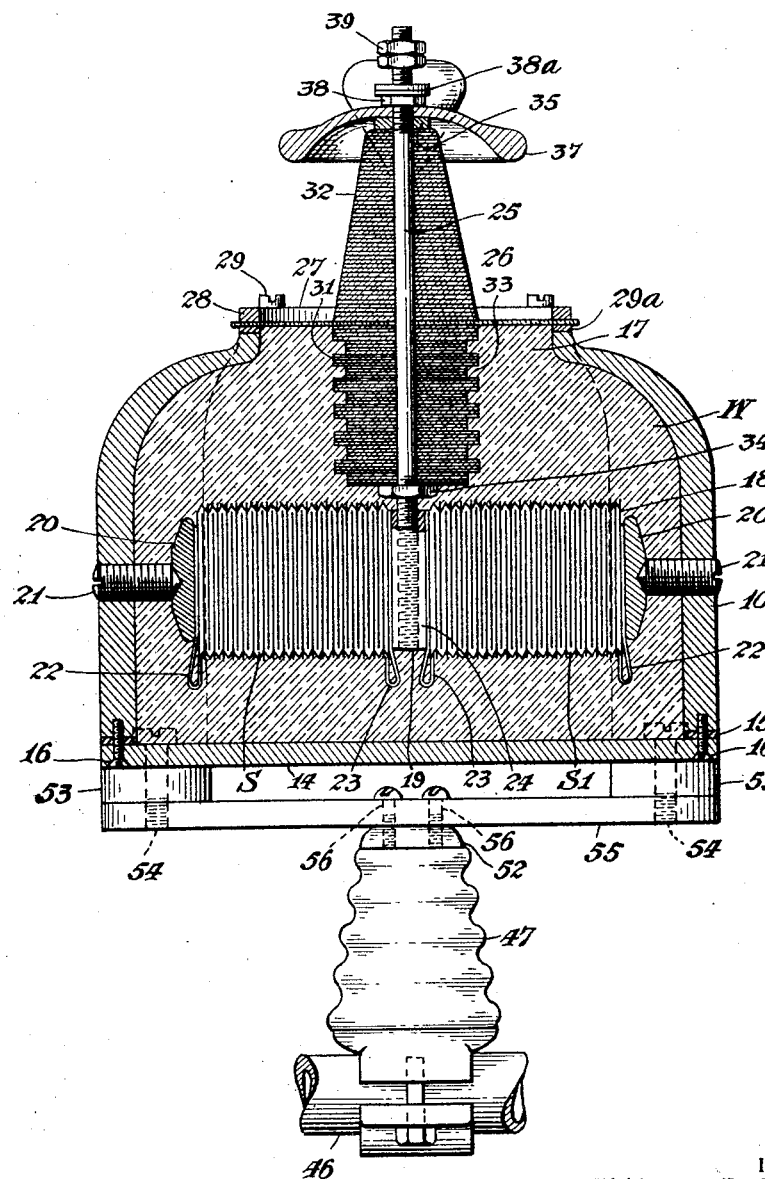

Patented Mar. 22, 1927.

1,621,901

UNITED STATES PATENT OFFICE.

WILLIAM H. PRIESS, OF MONTCLAIR. NEW JERSEY, ASSIGNOR TO WIRELESS SPECIALTY APPARATUS COMPANY, OF BOSTON, MASSACHUSETTS, A CORPORATION OF NEW YORK.

ELECTRICAL APPARATUS.

Original application filed December 5, 1921, Serial No. 519,868. Patent No. 1,499,403, dated July 1, 1924. Divided and this application filed December 5, 1923. Serial No. 678,557.

This invention relates to electrical apparatus and more specifically to electrical condensers. This application is a continuation in part of my copending application Serial No. 465,137, filed April 28, 1921, Patent No. 1,558,043 patented 20 October, 1925, and a division of Serial Number 519,868, filed Dec. 5, 1921, Patent Number 1,499,403, patented July 1, 1924.

Condensers and spark gaps embodying the present invention are for use generally, but in particular the specific embodiment in condensers herein illustrated is adapted for use to interconnect a low loss high-powered radio frequency reservoir circuit and an antenna circuit tuned to the same period. The condenser transfers the energy from the reservoir to the antenna. The condenser of this invention is characterized by being adapted for high voltages and relatively small capacity. As an example of a practical and commercial embodiment of such condenser, it may have a capacity of .00002 mfd. and be capable of withstanding 50,000 volts effective (70,000 volts maximum), at two amperes and 600 meters maximum.

The type of condenser embodying the present invention is known as a mica condenser inasmuch as it usually comprises a stack composed of alternate sheets of foil and dielectric, the foil consisting preferably of a soft material such as lead or tin, and the dielectric consisting preferably of mica, which is one of the best dielectrics known for this purpose.

The stacks each are made up of sections connected in series with separators between the sections, and are clamped and secured within a suitable casing, the casing preferably in service constituting one of the terminals of the condenser, or an electrical connection between stacks.

An object of the invention is to provide a spark-gap that will ensure proper protection irrespective of careless handling of the condenser.

Another object of the invention is to provide a novel form of spark-gap for preventing excessively high differences of potential between parts of the condenser and the subsequent destruction thereof.

In the accompanying drawings, I have illustrated one embodiment of the invention in which Figure 1 is an elevation thereof with part of the casing broken away;

Fig. 3 is a sectional elevation on the line 3—3 of Fig. 2, looking in the direction of the arrows.

Figure 1:
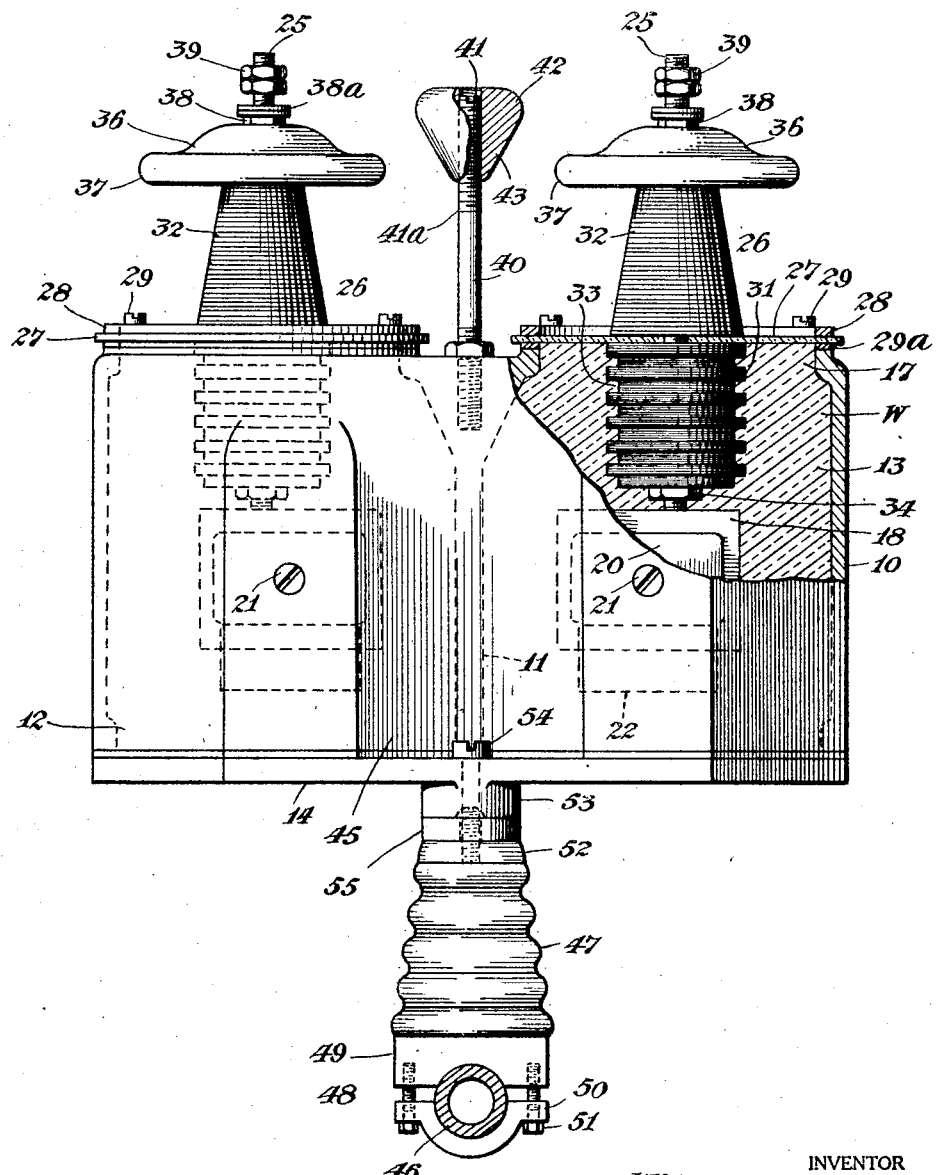
Figure 2:
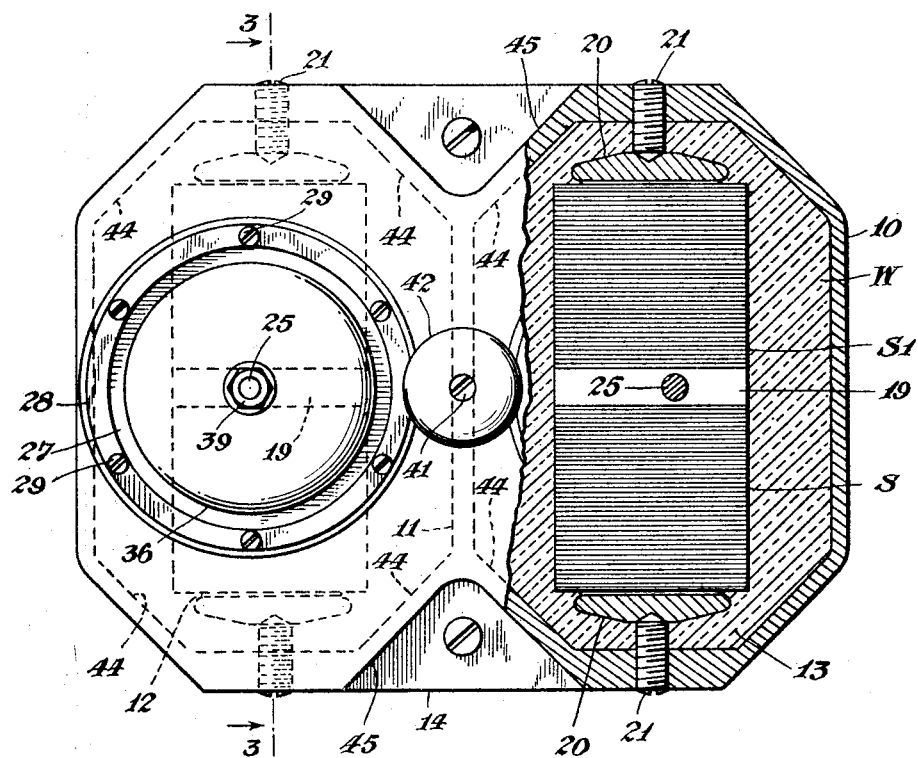
Fig. 2 is a plan view thereof, with part of the casing broken away.

Referring to the drawings, I have illustrated a casing 10 containing the condenser elements or stacks S′, which casing is preferably of metal and constitutes a midpoint series connection between the stacks, or, if so desired, a terminal of the condenser. In this embodiment, the casing is divided by a metal conductive partition 11 into two chambers 12 and 13, each adapted to receive a pair of stacks S′, or a two-part stack. The casing has an opening at one end, i. e., the bottom, covered by removable closure 14 common to the two chambers 12 and 13 and secured to the casing against a gasket 15 by means of screws 16. At the opposite, i. e., top end of the condenser casing are openings 17 through which the high potential terminals and their insulators of the condenser extend, closing the openings as hereinafter described, one of the openings 17 being provided for each chamber, the bottom closure 14, however, being common to both chambers 12 and 13, whereby the latter may be filled with a suitable insulating material W such as molten paraffin or oil.

The stacks S′ consist preferably of alternate sheets of foil and dielectric, preferably mica, and are made up of sections connected in series with separators 18 between the sections in the manner illustrated in Fig. 3. The stacks of each pair are arranged horizontally and end to end within the casing; that is, the sheets composing them are arranged vertically with reference to closure 14. The inner adjacent ends of the stacks or stack parts engage a suitable metal pressure member 19 having relative high thermo-conductivity, the stacks being arranged in the same straight line and being compressed against the member 19 by means of a pair of metal pressure plates 20 engaging the outer ends of the stacks and compressed against the same by means of metal screws 21 threaded through the casing and engaging the members 20, the plates 20 and screws 21 having a high thermal conductivity to the casing 10. Thus the outer ends of the stacks have a high thermal-conductivity to the metal casing which is a good radiating means. The outermost section of each stack is electrically connected to the adjacent pressure plate 20 by means of a copper strip lead 22 (Fig. 3) which is secured to the free terminal of the outermost section and bent back between the stack S or S' and the pressure member 20. The inner ends of the stacks are in like manner electrically connected to pressure member 19 by means of flexible copper strip leads 23, which are bent back and interposed between member 19 and the inner ends of the stacks, whereby the stacks are electrically connected at their outer ends to the casing as a common conductor, and at their inner ends to member 19. Each central pressure member 19 is provided with a threaded opening 24, in which is threaded a heavy metal rod or terminal 25, which projects through the opening 17 to each chamber 12 and 13.

Inasmuch as each high potential terminal 25 must be thoroughly insulated from the casing 10, which is at an intermediate potential, I utilize an insulating device 26 for each. In the present embodiment, this insulating device comprises a disk or plate 27 of insulating material, which is of an area greater than the area of the opening 17 in the casing and extending over the boundaries of said opening. This disk is preferably of some material having high insulating qualities and low loss such as mica, and should be so designed as to withstand the difference in potential between the casing 10 and terminals 25. It is preferred that the plate 27 consist of mica, which is one of the best materials for this purpose,—the plate being clamped at its edge to the casing 10 by means of a metal ring 28 and screws 29 passing through the ring 28 into the casing 10, a suitable gasket 29ᵃ being interposed between the mica sheet and the casing 10 to secure a tight joint. The members 25 extend through the disks 27. Mounted around each terminal 25 below the plate 27 is an insulating bushing 31 of reduced diameter compared to plate 27. This bushing is provided with corrugations or grooves 33 arranged circumferentially therearound to increase the creepage distance between the terminal 25 and casing 10, and consists preferably of a laminated structure; for instance, a plurality of mica pieces or disks of diameter reduced compared with the disk 27 and compressed together in the manner hereinafter described.

Mounted upon the opposite side of the large mica plate 27 is an insulating bushing 32 of reduced diameter compared with disk 27 and surrounding and insulating the upper portions of the terminal 25. Like the bushing 31, the bushing 32 is also of laminated insulating material preferably built up of superimposed pieces or disks of mica and of decreasing diameter upwardly as illustrated, forming an upwardly tapering bushing.

The insulating device 26 is preferably constructed or assembled on terminal 25 by assembling thereon the mica disks, plates or washers in their proper order. In the embodiment herein illustrated, a nut 34 is threaded on the lower end of member 25. The mica washers or pieces constituting the bushing 31 are then positioned or assembled on member 25 upon nut 34, then disk 27 is positioned and then the pieces constituting the bushing 32 are positioned on member 25. A round nut 35 (Fig. 3) is threaded upon the upper end of member 25 to hold the mica sheets and pieces in position against dislocation. The assembly is then treated in a bath of hot molten insulating material, which will act more or less as an adhesive, for about fifteen minutes until bubbles cease, either with or without the application of vacuum. Suitable materials for this purpose are beeswax, paraffin, insulation varnish or sulfur or insulating mixtures containing any of these materials. The assembly while hot and impregnated with molten insulating material is compressed or clamped tightly by nut 35 and allowed to cool, thus clamping the mica sheets together in a solid mass held together by nut 35 (which may be pinned to member 25) and by the fusible insulation which has now solidified. The bushing 32 is then cut, turned or ground to proper shape and polished, providing a smooth tapered surface. The bushings 31 and 32 are thus retained and supported on plate 27 and held under compression entirely by means of member 25 and nuts 34 and 35. The grooves 33 are formed by assembling intermediate mica washers of reduced diameter.

Mounted on each terminal 25 above each nut 35, in close electrical contact therewith and with each member 25, is a concavo-convex metal member 36, having its concave side facing the bushing 32 and having its rounded edge 37 concentric with and spaced from the clamping ring 28. Such mounting of member 36 is by screwing member 36 down upon member 25 to any desired position of installers or manufacturing adjustment determined by the thickness of nut 35 of Fig. 3. The inclination of the outer surface of the bushing 32 and the curvature and spacing of the member 36 (the latter determined as aforesaid by nut 35) are so arranged with reference to each other and so proportioned that any difference of potential between the opposite ends of the member 25 produces electrical stresses not through the insulator 32 but mainly through the air from member 36 to the casing 10, maintaining the electrical field parallel with the bushing 32 instead of cutting the same. In other words, member 36 with casing 10 provides a static shield preventing losses in the insulator 32 and the destruction thereof. The members 36 also perform additional functions in that they provide large-surfaced terminals for radiating heat generated in the stacks and conducted through the terminals 25 to members 36. The members 36 also serve as protectors or dust-guards for the insulating devices 26, preventing deterioration thereof; that is, each is located above the insulating disk 27 and the bushing 32. Each member 36 also constitutes an electrode of a spark-gap device described hereinafter. Each corona member 36 is secured in place by means of a nut 38 threaded upon the upper portion of the member 25, and above this are located washers 38ª and nuts 39 whereby any suitable lead may be attached to the high potential terminal in the usual manner.

The stacks SS' in each chamber may be adjusted as a unit by means of the two pressure screws 21 (Fig. 3), in opposite directions to properly locate each terminal 25 with reference to each other and with reference to its opening 17, whereby the insulating device 26 may be properly clamped in position.

It will be seen that stacks SS' of each chamber are connected in parallel with one another, the inner or mutually facing ends being connected to the common terminal 25, and their outer ends to the casing, the casing 10 in the present instance forming a midpoint connection between the two sets of stacks in the two chambers. Casing 10 connects the two sets of stacks in series with the terminals 25 projecting through and insulated from the casing.

In order to protect the condenser against excessively high voltages, beyond a value for which the condenser is designed, I have provided a spark-gap device (Fig. 1) which co-operates with each of the shields 36 to form therewith spark-gaps. This spark-gap device comprises a metal rod or stud 40 threaded into the top of the condenser casing 10, in conductive relation thereto (i. e., connected to the midpoint of the condenser between the two sets of stacks) and between and in spaced relation to shields 36 of the two terminals 25 from the sets of stacks. The upper end 41ª of the metal rod 40 is threaded. Meshing with the threaded end 41ª is an adjustable conical metal member 42, which may be adjusted vertically to vary the distances between its inclined surface 43 and the adjacent shields 36, providing with the shields 36 spark-gaps for protecting each set of stacks SS', the length of the gaps depending on conditions specified below.

The conical member 42 may be locked by a set screw 41 after its correct location (specified below) is determined for any given condenser.

The distance between members 42 and 36 to form a spark-gap depends on the radius of curvature of adjacent portions of the two parts, the shorter the radius of curvature of such adjacent portions the greater the distance or spacing between them, must be to withstand a given difference of potential. In the present design, the distance between the member 42 and each edge 37 of each bell 36 is such as to provide the required spacing to protect the condenser for the given radii of curvature of such adjacent parts, the greater the radius of curvature of such adjacent portions the less the corona effect between the parts at a difference of potential will be and the less the distance may be to protect each set of stacks from voltages exceeding the designed value.

The object of the spark-gap device of the present invention is to protect the condenser by preventing the user from exceeding the rated potential. Axial adjustment of conical member 42 sets a protection of equal value for each half of the condenser. If member 42 is removed from stud 40, for any reason, the spark-gaps consist of stud 40 and the shields 36. The threads on stud 40 have a very small radius of curvature so that when member 42 is removed, the condenser will spark even at a potential lower than the rated voltage or lower than the voltage each set of stacks is designed to stand even though the length of each gap is thereby increased. If stud 40 also is removed, there will be formed a single spark-gap between the two shields 36 protecting both sets of stacks against voltages exceeding those for which the condenser is designed. In like manner, when the two shields 36 constitute the spaced members of the spark-gap, the condenser will spark over at a potential lower than the total rated voltage, the radii of curvature of the curved edges 37 being so designed to produce this result for a given spacing between shields 36.

I find, for example, in a commercial embodiment of the invention with stud 40 and member 42 in place, as illustrated, and with member 42 positioned to form a gap of $\tfrac{1}{16}$ inch with each shield 36, the condenser will flash over at approximately 25,000 volts effective from either shield 36 to the member 42. With member 42 removed, the distance between each shield 36 and stud 40 is increased to about $\tfrac{7}{8}$ inch, but owing to the small radius of curvature of stud 40 or its threads compared to that of member 42, the condenser will flash over around 24,000 or 25,000 from either shield 36 to the stud 40, still maintaining the protection below the designed value. If stud 40 is removed, the distance between the two shields is about two inches, but in this case the gap must handle the entire voltage impressed across terminals 25 and with a given radius of curvature of the edges 37, the condenser will spark over at about 46,000 volts effective.

When stud 40 is removed, the gap formed by the two shields 36 will not protect the condenser in every case because of the conditions existing in the circuit in which the condenser is used. In most cases, however, when member 42 and the stud 40 have been removed, probably through carelessness, the gap between the shields will be sufficient to protect the condenser. The spark-gap device above described and herein illustrated is "fool-proof." The adjustability of member 42 is a convenience in securing the correct spacing between member 42 and each shield 36, while, if member 42 is removed, there is still maintained a non-adjustable gap between stud 40 and each shield 36 such as to sufficiently protect the condenser. Inasmuch as the members 40—42 are in electrical connection to the casing 10 (a midpoint series connection between the two sets of stacks), each gap formed between them and one of the shields 36 controls only approximately one-half of the total impressed voltage. But when the two shields 36 form the gap, this gap protects the total designed against voltages exceeding the total designed voltage, although the length of gap between the two shields is greater than twice the distance between each gap and conical member 42. Inasmuch as the potential necessary to break down a gap does not vary as a straight line function of the length of the gap, the longer gap will break down at a potential lower than twice the potential necessary to break down one of the shorter gaps.

The insulators 26, for the purpose of insulating the high potential terminals 25 from the casing, provide a long creepage path with short height. Additional creepage is obtained by providing circumferential grooves in either or both of the mica bushings upon either or both sides of the mica disks 27. I have shown such grooves 33 in the mica bushing 31. In the present construction, each insulator 26 comprises a single mica disk 27 clamped to the casing 10, and built-up disks of mica of reduced diameter forming bushings upon and supported by the disk 27, the bushings being clamped to the disk 27 at opposite sides thereof by means of the member 25 and cooperating nuts threaded thereon.

By the illustrated example of the invention, instead of using one stack, I have used four stacks, each stack having a minimum length consistent with the creepage requirement between the opposite ends of the stack due to voltage differences. Each stack has maximum thermal conductivity to the casing and to the high potential terminals. Each high potential terminal is provided on the exterior of the condenser with a corona spark-gap shield 36 constituting a heat-radiating member, the casing 10 constituting the other heat-radiating member. It will thus be seen that each stack, of minimum length, engages at opposite ends conductors having a high thermal conductivity and large heat-radiating powers. The construction and method of building the stack is such that side slip of the sheets in the stack is prevented. The pressure applied to the opposite ends of each stack should be of the order of thousands of pounds per square inch, and of an order which is slightly below a value that will cause spreading of the foil sheets. The structure above-described is such that the stacks are maintained at a minimum temperature for a given load, which results in efficient operation and low loss. In this disclosure, by placing four short stacks, which are electrically in series parallel with one another and each consisting of series sections, thermally parallel between high-conducting terminals, the thermal path is improved in a ratio of approximately sixteen to one over a single stack having the same electrical characteristics. In this arrangement, I have improved the condenser construction so that it will carry four times the energy of the equivalent single stack with the same heating. In the present invention, also, for the same capacity, I have been able to reduce the amount of mica required in a condenser, thus materially reducing the cost. For instance, in a condenser having a single stack of the same length as the total length of the four stacks of the present condenser and having the capacity of the condenser of the present invention, there would be required mica sheets of four times the area over those required for the condenser of this invention. Furthermore, a much more expensive clamping means would be required to obtain the same pressure per unit area. Such clamping means moreover would be inferior and inefficient as well as bulky. In the present disclosure, by the methods of manufacturing the stack as above described, and by reason of the minimum length of the stack, side slip has been reduced to a minimum, and the clamping feature simplified while maintaining the high pressure.

It will be seen, therefore, that the disclosed preferred embodiment of the invention provides a very efficient high tension condenser which is not only protected by the spark-gap means claimed hereinafter, but which is very compact, and in which the stacks are maintained under the highest practicable compression to maintain the sheets of foil and dielectric in intimate contact to prevent losses in the stack and to increase its thermal conductivity. The casing forms a heat-conducting and radiating device in contact with the outer ends of the stacks. The inner ends of the stacks, in like manner, have high thermal conductivity to the outside through blocks 19 and terminals 25, where the heat is radiated by the heat-radiating members 36 upon the terminals.

It is to be understood that the invention is not limited to the embodiments and features specifically shown and described herein, but that such embodiments and features are subject to changes and modifications without any departure from the spirit of the invention.

I claim:

1. An electrical condenser comprising a plurality of sheet-stacks; a common metal casing therefor and connected therewith; a corresponding plurality of stack terminals extending outside the casing; and a metal member electrically connected with and mounted on the outside of the casing and spaced from said terminals to constitute a common spark-gap electrode establishing protective spark-gaps with said terminals.

2. In an electrical condenser, a metal casing, condenser elements mounted within the casing, said casing constituting part of the electrical circuit of said elements, spaced terminals electrically connected to said elements and projecting through said casing and insulated therefrom, and an adjustable spark-gap member mounted upon the casing between said terminals, constituting therewith spark-gaps and adjustable to vary the distances between the terminals and the spark-gap member.

3. In an electrical condenser, a metal casing, condenser elements within the casing, the casing constituting part of the electrical circuit of said elements, terminals electrically connected to said elements and projecting through said casing at one side thereof, insulating bushings mounted on the casing and surrounding said terminals, static shields mounted upon said terminals above said bushings preventing losses therein and comprising bell-shaped members extending laterally beyond the bushings, and a metal rod mounted upon said casing between said shields and spaced therefrom and in parallelism with the terminals, said rod having adjustably mounted thereon a conical spark-gap member forming with said shields spark-gaps, whereby upon adjustment of the member the distance between the same and both shields is varied.

4. In an electrical condenser, a casing, condenser elements within said casing, said casing being electrically connected to certain of said elements, a high potential terminal electrically connected to said elements and projecting through said casing and insulated therefrom, said terminal being provided with a metal member projecting therefrom, and a spark-gap member electrically connected to the casing and mounted on said casing adjacent to said metal member, and having a conical member adjustable thereon and forming with the metal member a spark-gap, whereby upon adjustment of the conical member the distance between the same and the terminal can be varied.

5. In an electrical condenser, a metal casing having a plurality of chambers therein, pairs of condenser stacks comprising alternate sheets of foil and dielectric and comprising sections connected in series and mounted horizontally within said chambers, central pressure members with which the inner ends of the stacks of each chamber engage and with which they are electrically connected, means engaging the outer ends of the stacks of each chamber and co-operating with the casing for compressing the stacks, the outer ends of the stacks being electrically connected to the casing, terminals connected to said central members and projecting through the casing, an insulating bushing surrounding each terminal whereby the terminal is insulated from the casing, a closure for an opening at one end of the casing through which a filler of insulating material may be placed, a filler of insulating material within the casing and surrounding said stacks, terminals and inner ends of the bushings, static shields mounted upon said terminals above said bushings whereby the electric field is directed in parallelism to the bushing preventing losses therein, and a spark-gap device mounted between said shields, constituting therewith spark-gaps, electrically connected to said casing and comprising an adjustable conical member co-operating with the shields, whereby upon adjustment of the conical member the distances between the conical member and the shields are varied.

6. In a spark-gap device, metal members adapted to be at a difference of potential and spaced from each other forming a spark-gap, said members being relatively adjustable and one of the members comprising a surface arranged at an angle to the direction of adjusting movement, whereby, upon such movement, the sparking distance between the members may be varied.

7. In a spark-gap device, a plurality of terminals and a metal casing adapted to be at a difference of potential from said terminals and insulated therefrom; electrical apparatus inside said casing, different parts of said electrical apparatus being electrically connected respectively to said casing and to said terminals and a spark-gap member forming with said terminals spark-gaps and electrically connected to said casing.

8. In a spark-gap device, metal members adapted to be at a difference of potential, and spaced from each other to form a spark-gap, one of said members comprising an adjustable conical member for varying the distance between the members.

9. In a spark-gap device, comprising two metal members spaced from one another and subjectable to a difference of potential, and one of said members constituting a circuit terminal of an electrical apparatus, the other member also being connected to such apparatus; an insulating bushing surrounding said terminal member; and a metal shield mounted on said terminal member beyond said bushing, also spaced from said other metal member, and protecting the bushing around the terminal member; said metal member spaced from the terminal member establishing a spark-gap with said protecting shield.

10. In a spark-gap device, comprising two metal members spaced from one another and subjectable to a difference of potential, one of said members constituting a circuit terminal of an electrical apparatus and the other member being also connected with such apparatus; an insulating bushing surrounding said terminal member; and a metal shield mounted on said terminal member beyond said bushing; also spaced from said other metal member, and protecting the bushing around the terminal member; said protecting shield and the other member spaced therefrom being relatively adjustable and constituting an adjustable spark-gap.

11. In a spark-gap device, a metal casing containing electrical apparatus a low potential portion of which is electrically connected thereto, and a plurality of terminals for high potential portions of said apparatus and projecting out thru the casing, insulated therefrom; spaced from one another outside the casing, and constituting electrodes of a spark-gap.

12. In a spark-gap device, a casing containing elements electrically connected thereto, spaced terminals projecting through said casing and electrically connected to said elements, bushings insulating said terminals from the casing, metal shields mounted on the terminals to protect the bushings and constituting spark gap members.

13. In a spark-gap device, a metal casing, electrical elements therein electrically connected to the casing, a terminal connected to said elements and projecting through the casing, an insulating bushing surrounding said terminal, a static shield mounted on the terminal above the bushing, a stud mounted on said casing in parallelism to said terminal and electrically connected to the casing and a conical member adjustable on the stud and forming with said shield a spark gap.

14. In a spark-gap device, a metal casing, electrical elements therein electrically connected thereto, a terminal projecting through the casing and electrically connected to said elements, an insulating bushing surrounding said terminal, a static shield mounted on said terminal above said bushing, a stud mounted on the casing and electrically connected thereto, and an adjustable member mounted on said stud and forming with said shield a spark gap.

15. In a spark-gap device, spaced metal members adapted to be at a difference of potential, at least one of said members having a curved surface, and a curved metal device adjustably mounted thereon, having a radius of curvature greater than that of the curved member on which it is mounted and forming with the other member a spark gap, said members being capable of forming a longer spark gap, upon the removal of said device, the difference in length of the spark gaps being compensated for by reason of the difference in radii of curvature of the curved parts to maintain the required protection.

16. In a spark-gap device, a metal casing, metal members projecting from said casing and insulated therefrom, spaced from one another and subjectable to a difference of potential, one of said members having an electrode adjustably and removably mounted thereon and forming an adjustable spark-gap with the other member; and said members being spaced to establish a spark-gap between them upon the removal of said adjustable electrode.

17. In an electrical condenser, a metal casing, condenser elements within the casing and electrically connected thereto; a circuit terminal electrically connected to said elements and projecting thru said casing and insulated therefrom; a metal member mounted on said casing; and an electrode adjustably and removably mounted on said member and forming a spark-gap with said circuit terminal; said metal member and terminal being spaced to establish a spark-gap between them upon removal of said adjustably mounted electrode.

18. In a spark-gap device, spaced members having adjacent curved portions, and an adjustable curved member mounted on one of said first-mentioned members and having a greater radius of curvature than that of the member on which it is mounted and forming with the other member a spark gap adjustable in length, said first-mentioned members being capable of forming a spark gap upon the removal of the adjustable member.

19. In an electrical condenser, a metal casing, condenser elements mounted within the casing, the casing forming an electrical connection between the elements. spaced terminals mounted in the casing, insulated therefrom and electrically connected to said elements, metal members having rounded edges and mounted on said terminals in spaced-apart relation, a stud secured on said casing between said metal members, and a conical member adjustable on said stud and forming with said members adjustable spark gaps, said stud having a smaller radius of curvature than said conical member and forming non-adjustable spark gaps with the terminal members upon the removal of the conical member, said terminal members being capable of forming a spark gap with each other upon removal of said stud.

20. In an electrical condenser, a metal casing, condenser elements therein connected in series by said casing, terminals connected to said elements, insulating material between said terminals and the casing, and static shields mounted on said terminals above the insulating material.

21. In an electrical condenser structure, the combination with the condenser itself, a metal enclosing casing therefor, and a condenser terminal projecting thru and insulated from the casing; of a metal member removably mounted on the casing and electrically connected with the condenser itself and spaced from said terminal to form a protective spark-gap therewith; and an electrode removably mounted on said removable member and also spaced from said terminal to form a protective spark-gap therewith.

22. In an electrical condenser structure, the combination with the condenser itself, a metal enclosing casing therefor and electrically connected therewith, and a condenser terminal projecting thru and insulated from the casing; of a metal member removably electrically connected with said casing and spaced from said terminal to form a protective spark-gap with the latter.

23. In an electrical condenser structure, the combination with the condenser itself, a metal enclosing casing therefor and electrically connected therewith, and a condenser terminal projecting thru and insulated from the casing and having a curved portion, of a metal member mounted on and electrically connected with the casing and having a threaded portion spaced from said curved portion of said terminal to form a protective spark-gap between the threaded portion of said metal member and the curved portion of said terminal.

24. In an electrical condenser, the combination with a stack of sheets, a metal casing therefor, and a stack-terminal projecting out thru the casing; of a spark-gap electrode electrically connected with the stack; insulating material between the stack terminal and the casing; and a metal static shield electrically connected to said terminal and operatively fixedly supported thereon in position relative to the casing and insulating material which protects the latter; and a spark-gap electrode adjustably spaced from said static shield to establish a protective spark-gap therewith irrespective of the relative positions of the static shield and casing.

25. In an electrical condenser construction, the combination with the condenser itself, a metal enclosing casing therefor, and a condenser terminal projecting out thru the casing; of a spark-gap electrode electrically connected to the condenser itself; insulating material between said terminal and the casing; and a metal static shield electrically connected to said terminal and mounted thereon in position relative to the casing and insulating material which protects said insulating material; said spark-gap electrode and static shield establishing between them a protective spark-gap of less length than the distance between the static shield and the casing.

26. In an electrical condenser construction, the combination with the condenser itself, a metal casing therefor, and a condenser terminal projecting out thru the casing and insulated therefrom; of an electrode supported on the outside of the said casing and also connected to the enclosed condenser; said electrode and terminal being spaced from one another to constitute a protective spark-gap.

27. An electrical condenser comprising a plurality of sheet-stacks; a common metal casing therefor and electrically connected therewith; a corresponding plurality of stack terminals extending out thru the casing, and metallic means electrically connected with the casing, located outside the casing, and spaced from said terminals to constitute protective spark-gaps therewith.

28. An electrical condenser comprising a plurality of sheet-stacks; a common metal casing therefor electrically connected with the ends of said stacks; a corresponding plurality of condenser terminals connected respectively to mid-points of said stacks; and metallic means supported on and electrically connected with the casing and spaced from said terminals to constitute protective spark-gaps therewith.

29. An electrical condenser comprising a plurality of sheet-stacks, a common metal casing therefor electrically connected therewith; a corresponding plurality of stack terminals extending out thru the casing and insulated therefrom; and a metal member electrically connected with and mounted on the outside of the casing, and spaced from said terminals to constitute a common spark-gap electrode establishing protective spark-gaps with said terminals; said metal member being adjustably mounted and symmetrically constructed whereby in all adjusting positions it provides equal protection for each of said plurality of stacks.

30. An electrical condenser comprising a plurality of sheet-stacks arranged end to end, a metal casing enclosing said stacks and electrically connected with the outer ends thereof; a condenser terminal electrically connected with the inner ends of said stacks and extending to the outside of the casing; and a metal member electrically connected with and supported outside of the casing and spaced from said terminal to establish a protective spark-gap therewith.

31. In a spark-gap device, the combination with a disk-like metal member having a curved edge, of a cone-like metal member spaced from the curved edge and in the plane of said disk member, said cone member being mounted to be adjustable transversely of the plane of the disk member.

WILLIAM H. PRIESS.